(12) United States Patent
Colsky (10) Patent No.: US 7,278,372 B2
(45) Date of Patent: Oct. 9, 2007

(54) LITTER BOX

(76) Inventor: Andrew E. Colsky, 1200 Arlington Ridge Rd. #104, Arlington, VA (US) 22202

( * ) Notice: Subject to any disclaimer, the term of this patent is extended or adjusted under 35 U.S.C. 154(b) by 225 days.

(21) Appl. No.: 11/094,224

(22) Filed: Mar. 31, 2005

(65) Prior Publication Data

US 2005/0224006 A1   Oct. 13, 2005

Related U.S. Application Data

(60) Provisional application No. 60/560,261, filed on Apr. 8, 2004.

(51) Int. Cl.
*A01K 29/00* (2006.01)
(52) U.S. Cl. ...................................... 119/166
(58) Field of Classification Search ................ 119/163, 119/166
See application file for complete search history.

(56) References Cited

U.S. PATENT DOCUMENTS

| | | | | |
|---|---|---|---|---|
| 4,120,264 A | * | 10/1978 | Carter | 119/166 |
| 4,574,735 A | | 3/1986 | Hohenstein | |
| 4,846,104 A | * | 7/1989 | Pierson, Jr. | 119/166 |
| 5,107,797 A | | 4/1992 | LaRoche | |
| 5,402,751 A | * | 4/1995 | De La Chevrotiere | 119/166 |
| 5,507,252 A | | 4/1996 | Ebert | |
| 5,509,379 A | * | 4/1996 | Hoeschen | 119/166 |
| 5,551,375 A | | 9/1996 | Flores | |
| 5,662,066 A | * | 9/1997 | Reitz | 119/163 |
| 5,752,465 A | | 5/1998 | Page | |
| 5,823,137 A | * | 10/1998 | Rood et al. | 119/166 |
| 5,911,194 A | * | 6/1999 | Pierson, Jr. | 119/166 |
| 5,931,119 A | * | 8/1999 | Nissim et al. | 119/163 |
| 6,126,015 A | | 10/2000 | Haymaker | |
| 6,286,459 B1 | | 9/2001 | Parr | |
| 6,463,881 B1 | * | 10/2002 | Reitz | 119/163 |

(Continued)

*Primary Examiner*—Michael Carone
*Assistant Examiner*—Valentina Xavier
(74) *Attorney, Agent, or Firm*—Welsh & Flaxman LLC (57) ABSTRACT

A pet litter box includes an elongated housing having a first end wall and a second end wall. The housing further includes a sidewall extending between the first end wall and the second end wall. The litter box also includes a base supporting the housing for rotation about a longitudinal axis. The first end wall of the housing includes a first end wall aperture shaped and dimensioned for the passage of a pet therethrough, the first end wall aperture being offset from a central longitudinal axis of the housing. The housing further includes a grate and a dividing panel respectively extending between the first end wall and the second end wall of the housing. The grate includes a first edge which remains in contact with an interior surface of the sidewall to define a grate/sidewall junction and the dividing panel similarly includes a first edge which remains in contact with the interior surface of the housing to define a panel/sidewall junction. The sidewall further includes an elongated sidewall aperture positioned adjacent the panel/sidewall junction such that the dividing panel is positioned substantially between the grate and the sidewall aperture. In use, rotation of the housing causes litter within the housing to move toward the grate, the grate defining a barrier preventing litter waste from passing therethrough and into a reservoir defined by the dividing panel and the interior surface of the sidewall such that continued rotation of the housing causes the litter waste to ride over the grate and dividing panel toward the sidewall aperture where the litter waste exits the housing.

11 Claims, 5 Drawing Sheets

U.S. PATENT DOCUMENTS 6,568,348 B1    5/2003   Bedard
7,096,824 B1 *  8/2006   Deasy ........................ 119/166

2002/0139312 A1 *  10/2002   Reitz ........................... 119/165
2005/0235920 A1 *  10/2005   Brokaski .................... 119/166

* cited by examiner

LITTER BOX

CROSS REFERENCE TO RELATED APPLICATION

This application is based upon U.S. Provisional Application Ser. No. 60/560,261, entitled "Litter Box", filed Apr. 8, 2004.

BACKGROUND OF THE INVENTION

1. Field of the Invention

The invention relates to a litter box. More particularly, the invention relates to a manual or automated cat litter box designed for the convenient removal and disposal of animal waste.

2. Description of the Prior Art

Pet litter boxes have been around for many years. Litter boxes allow a pet to go to the bathroom at a specific location and facilitate the relatively easy removal of the pet waste. In particular, the wet pet waste combines with the litter to produce large clumps that are relatively easy to remove. In particular, recent developments have produced animal litter that causes animal urine to coagulate with the litter, creating solid ball-like pieces. After the solid ball-like piece is formed, the urine and solid pet waste may be separated from the clean litter to permit cleaning of the litter box.

However, removal of the litter waste is oftentimes cumbersome, messy and unsanitary. In particular, many litter boxes require that an individual sift through the clean litter to remove the solid waste and solid ball-like pieces formed from urine waste. Many pet owners find sifting through litter in this manner to be undesirable and various systems have been developed for the convenient removal of litter waste.

In addition, many litter boxes are open and cats often spread litter beyond the confines of the litter box. Substantial messes can be created when even moderately active cats use these litter boxes on a regular basis.

With the foregoing in mind, elaborate litter systems have been developed which attempt to confine litter and make cleaning easier. These more elaborate litter boxes are, however, often cumbersome to utilize, expensive and oftentimes do not fully achieve the goal of providing a litter box which is enclosed, easily cleaned and inexpensive. The prior art also fails to adequately provide a litter box that is visually pleasing, reduces dust and provides for efficient space usage.

As such, a need exists for an improved litter box which provides pet owners with a convenient, reliable and inexpensive way of removing litter waste from the litter box. The present invention provides such a litter box.

SUMMARY OF THE INVENTION

It is, therefore, an object of the present invention to provide a pet litter box that includes an elongated housing having a first end wall and a second end wall. The housing further includes a sidewall extending between the first end wall and the second end wall. The litter box also includes a base supporting the housing for rotation about a longitudinal axis. The first end wall of the housing includes a first end wall aperture shaped and dimensioned for the passage of a pet therethrough, the first end wall aperture being offset from a central longitudinal axis of the housing. The housing further includes a grate and a dividing panel respectively extending between the first end wall and the second end wall of the housing. The grate includes a first edge which remains in contact with an interior surface of the sidewall to define a grate/sidewall junction and the dividing panel similarly includes a first edge which remains in contact with the interior surface of the housing to define a panel/sidewall junction. The sidewall further includes an elongated sidewall aperture positioned adjacent the panel/sidewall junction such that the dividing panel is positioned substantially between the grate and the sidewall aperture. In use, rotation of the housing causes litter within the housing to move toward the grate, the grate defining a barrier preventing litter waste from passing therethrough and into a reservoir defined by the dividing panel and the interior surface of the sidewall such that continued rotation of the housing causes the litter waste to ride over the grate and dividing panel toward the sidewall aperture where the litter waste exits the housing.

It is also an object of the present invention to provide a litter box wherein the housing includes a litter use area that is substantially opposite the sidewall aperture.

It is another object of the present invention to provide a litter box wherein the first end wall aperture, litter use area, grate, dividing panel and sidewall aperture are consecutively positioned about the circumference of the housing.

It is a further object of the present invention to provide a litter box wherein the first end wall aperture is substantially opposite the dividing panel and the grate.

It is also another object of the present invention to provide a litter box wherein the longitudinal axis is substantially aligned with a longitudinal axis of the housing.

It is yet another object of the present invention to provide a litter box wherein the longitudinal axis is substantially perpendicular to a plane in which the first end wall lies.

It is still a further object of the present invention to provide a litter box including a motor coupled to the housing for rotating the housing.

It is also an object of the present invention to provide a litter box including a handle coupled to the housing for facilitating rotation of the housing.

It is another object of the present invention to provide a litter box including a friction stop controlling rotation of the housing.

It is a further object of the present invention to provide a litter box wherein the grate is a plastic mesh shaped and dimensioned for allowing clean litter to pass therethrough, but preventing the passage of litter waste therethrough.

It is also a further object of the present invention to provide a litter box wherein the dividing panel includes a free edge opposite the panel/sidewall junction and the grate includes a free edge opposite the grate/sidewall junction, and the first end wall aperture is substantially diametrically opposed to either the free edge of the dividing panel or the free edge of the grate.

It is also an object of the present invention to provide a litter box wherein the dividing panel includes a free edge opposite the panel/sidewall junction and the grate includes a free edge opposite the grate/sidewall junction, the free edge of the dividing panel being coupled to the free edge of the grate.

It is another object of the present invention to provide a litter box wherein the housing is cylindrical. It is a further object of the present invention to provide a litter box wherein the housing is made out of plastic or metal.

It is also another object of the present invention to provide a litter box including a waste storage bin positioned adjacent the sidewall aperture.

It is a further object of the present invention to provide a litter box wherein the waste storage bin is selectively removable from the housing for facilitating disposal of litter waste.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
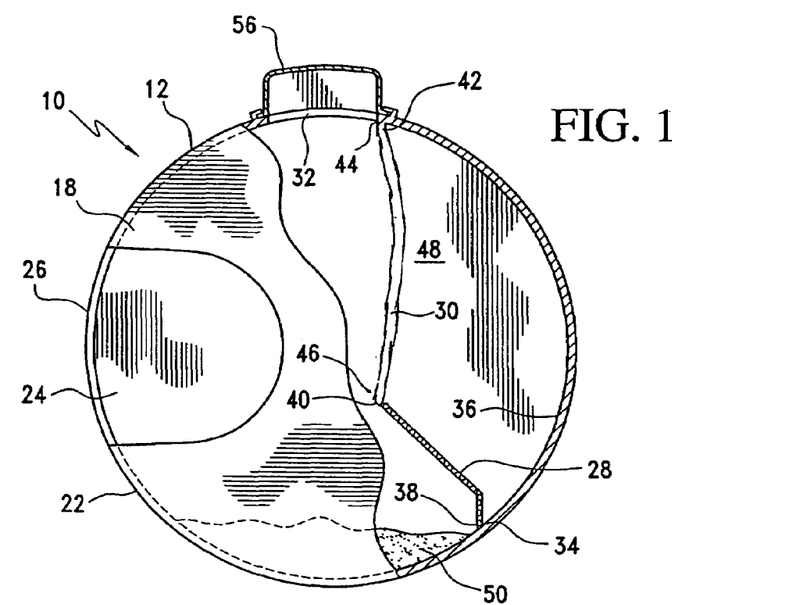
FIG. 1 is a partial cross sectional view along an end of the housing utilized in conjunction with the present litter box.
Figure 2:
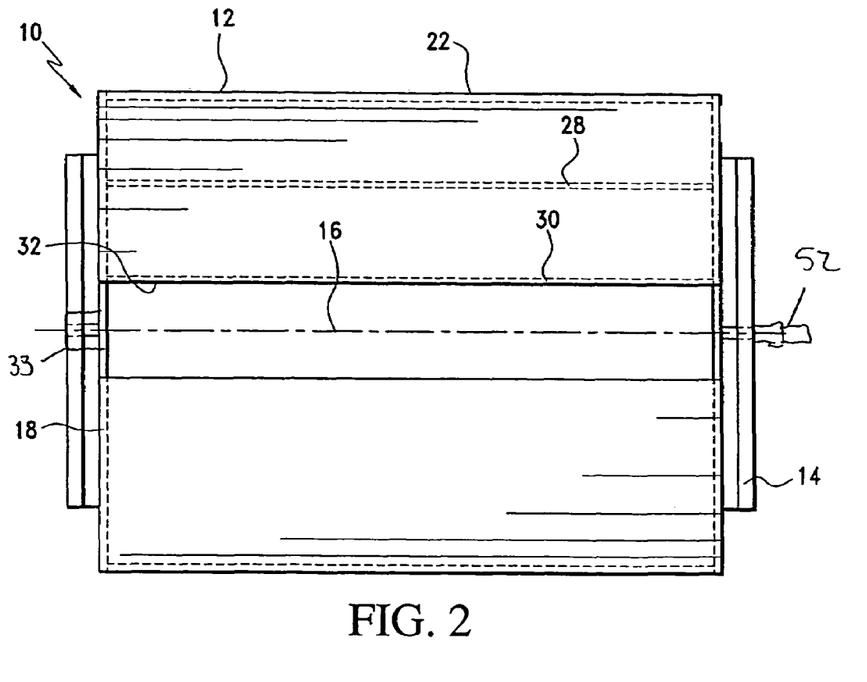
FIG. 2 is a top view of the present litter box.
Figure 3:
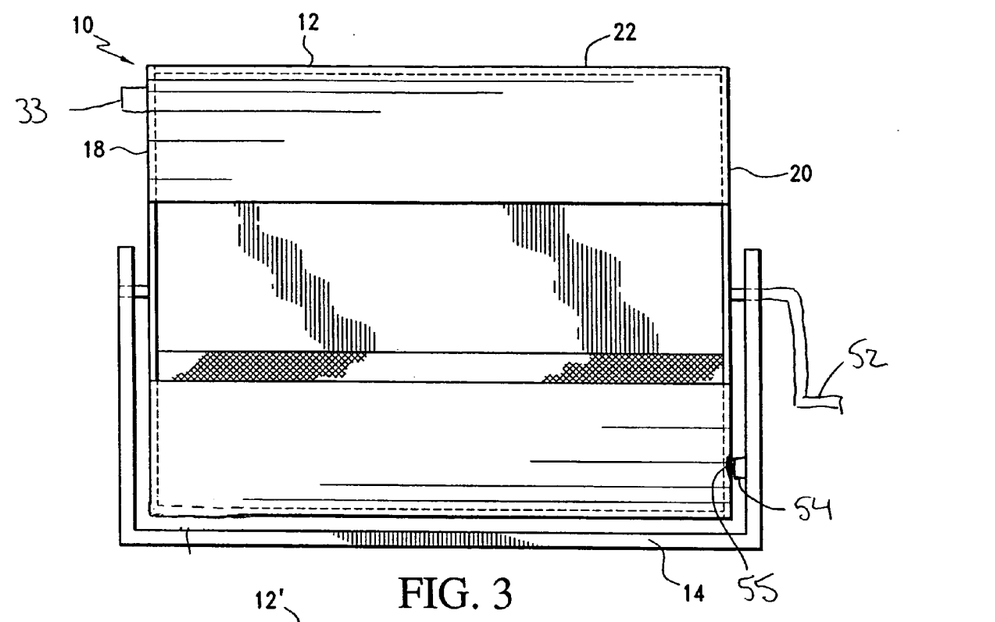
FIG. 3 is a side view of the present litter box.

With reference to FIGS. 1, 2 and 3, a pet litter box 10 is disclosed. The litter box 10 is adapted for the convenient and reliable removal of litter waste from the litter box 10. This is achieved by providing a litter box 10 structure which may be easily rotated to separate the litter waste from the clean litter without requiring that the pet owner physically sift through the litter, coming in direct contact with the litter waste.

The litter box 10 includes an elongated housing 12 rotationally mounted upon a base 14. For ease of use, the housing 12 is designed for ready removal from the base 14. This will facilitate ease of cleaning when needed. In particular, and as will be discussed below in greater detail, the base 14 is shaped and dimensioned for supporting the elongated housing 12 for controlled rotation of the housing 12 in a first direction about a longitudinal axis 16. In particular, the longitudinal axis 16 of rotation is substantially aligned with a central longitudinal axis of the housing 12.

The housing 12 includes a first end wall 18 and a second end wall 20. The first end wall 18 of the housing 12 and the second end wall 20 of the housing 12 are connected by a sidewall 22 which extends between the first end wall 18 and the second end wall 20. In accordance with a preferred embodiment of the present invention, the sidewall 22 is substantially cylindrical although other shapes may be employed without departing from the spirit of the present invention.

The sidewall 22 is preferably constructed from plastic to facilitate ease of manufacture, assembly and use. The light weight of the plastic is believed to enhance the usefulness of the litter box 10 by reducing the weight of the litter box 10 and reducing the manufacturing costs associated with the litter box 10. However, those skilled in the art will certainly appreciate that other materials may be employed without departing from the spirit of the present invention.

As mentioned above, the housing 12 further includes a first end wall 18 and a second end wall 20. The first and second end walls 18, 20 are substantially planar and are substantially perpendicular relative to the longitudinal axis of the housing 12 and the longitudinal axis 16 about which the housing 12 rotates. In accordance with a preferred embodiment, the first end wall 18 is provided with an end wall aperture 24 shaped and dimensioned for ingress and egress of a pet. The second end wall 20 is fully closed. However, it is contemplated that the second end wall 20 may also be provided with an aperture that would provide the pet with an entrance at either end of the housing 12.

With regard to the first end wall aperture 24, it is offset from the center of the first end wall 18 and the longitudinal axis 16 about which the housing 12 rotates. By offsetting the first end wall aperture 24 in this way, the likelihood of litter being accidentally forced through the aperture 24 is reduced as will be appreciated based upon the following disclosure. In addition, the positioning of the various components making up the present litter box 10 allows for maximum litter area. In accordance with a preferred embodiment of the present invention, the first end wall aperture 24 is formed such that an edge 26 of the first end wall aperture 24 coincides with the junction of the first end wall 18 and the sidewall 22. The remainder of the first end wall aperture 24 extends toward the central area of the first end wall 18.

The litter removal mechanism is substantially contained within the housing 12. In particular, the removal mechanism includes a grate 28 and a dividing panel 30 respectively extending between the first end wall 18 and the second end wall 20 of the housing 12. Briefly, the grate 28 and dividing panel 30 function to separate the litter waste and the clean litter, while also directing the litter waste out of an elongated sidewall aperture 32 formed in the sidewall 22 of the housing 12.

The grate 28 is preferably constructed from a plastic grid or wire mesh shaped and dimensioned to permit the free passage of clean litter therethrough while preventing the passage of litter waste therethrough. Although a plastic grid or wire mesh is disclosed in accordance with a preferred embodiment of the present invention, other grate materials may be employed without departing from the spirit of the present invention.

The grate 28 includes a first edge 34 that remains in contact with an interior surface 36 of the sidewall 22 and extends between the first end wall 18 and the second end wall 20 to define a grate/sidewall junction 38. The grate 28 also includes a free edge 40 that is directed away from the sidewall 22. The grate 28 is oriented at an oblique angle slanting away from the first end wall aperture 24 and toward the dividing panel 30.

The dividing panel 30 similarly includes a first edge 42 that remains in contact with the interior surface 36 of the sidewall 22 and extends between the first end wall 18 and the second end wall 20 to define a panel/sidewall junction 44. The dividing panel 30 also includes a free edge 46 that is directed away from the sidewall 22. The dividing panel 30 is oriented at an oblique angle slanting away from the sidewall aperture 32 and toward the dividing panel 30. The free edge 40 of the grate 28 is secured to the free edge 46 of the dividing panel 30 to thereby define a clean litter reservoir 48 in which the clean litter is temporarily stored during the rotation of the housing 12.

Figure 6:
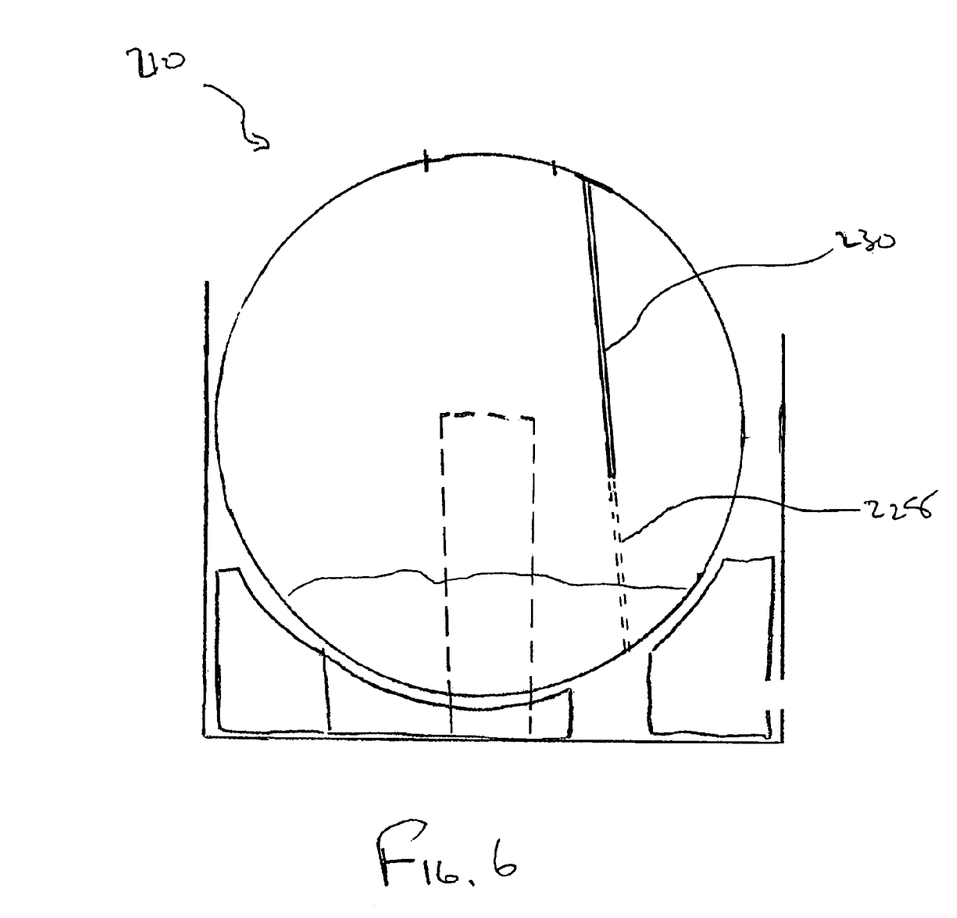
FIG. 6 is a cross sectional view along the end of an alternate embodiment of the present litter box.

Although a dividing panel and grate of a specific shape is disclosed in accordance with a preferred embodiment of the present invention, the dividing panel and grate may take other shapes and forms without departing from the spirit of the present invention. For example, and with reference to FIG. 6, the dividing panel 230 and grate 228 of the litter box 210 may be formed so as to extend along a straight chord within the housing.

Briefly, clean litter passes through the grate 28 during rotation of the housing 12. The clean litter then accumulates within the reservoir 48 created by the dividing panel 30, while the dirty litter clumps pass through the sidewall aperture 32. After the litter waste passes through the sidewall aperture 32 and rotation is prevented by a stop member 33, the rotation of the housing 12 is reversed, returning the litter box to its starting position as shown in FIG. 1. As the housing 12 is rotated back to its starting position, the clean litter flows out of the reservoir 48, through the grate 28 and back into position in the litter use area 50 located between the end wall aperture 24 and the grate 28, and opposite the sidewall aperture 32.

Figure 5:
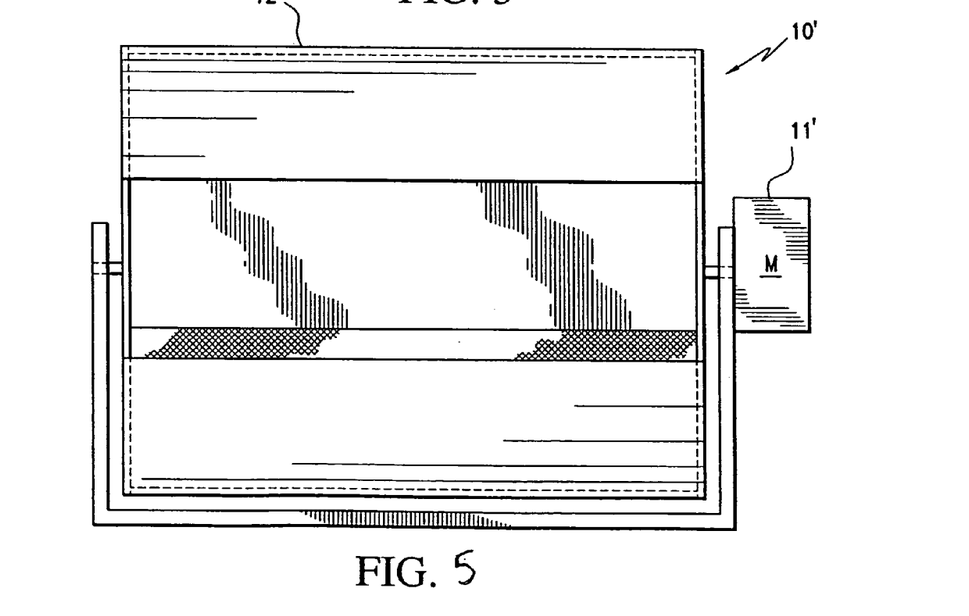
FIG. 5 is a side view of yet a further embodiment.

In use, and after a pet has used the litter box 10, the housing 12 is rotated about the longitudinal axis 16 approximately 180° in a clockwise direction. Rotation of the housing 12 may be facilitated by providing the housing 12 with a handle 52 that may be easily gripped by a pet owner wishing to rotate the housing 12. In accordance with an alternate embodiment, and with reference to FIG. 5, the litter box 10' may be automated and provided with a motor 11' controlling movement of the housing 12'. The motor 11' may be further automated to rotate on a predetermined scheduled basis. The motor 11' may be provided with a start button, a timer mechanism or a motion detector (for identifying litter activity). In accordance with a preferred embodiment of the present invention, the housing 12 is rotated in a clockwise direction. However, the direction of use may certainly be reversed without departing from the spirit of the present invention. In addition, while reversing rotation is disclosed in accordance with a preferred embodiment of the present invention, it is contemplated the housing could be rotated a complete 360 degrees within the spirit of the present invention.

As the housing 12 is rotated, the litter within the housing 12 is moved toward the grate 28, the grate 28 defining a barrier preventing litter waste from passing therethrough and into the reservoir 48 defined by the dividing panel 30, the grate 28 and the interior surface 36 of the sidewall 22. Since the litter waste is not permitted to pass through the grate 28 and into the reservoir 48, continued rotation of the housing 12 causes the litter waste to ride over the grate 28 and dividing panel 30 toward the sidewall aperture 32.

Once the sidewall aperture 32 reaches approximately its lowest point during the rotation of the housing 12, the litter waste will pass through the sidewall aperture 32 and into a waste storage bin 56 for easy removal of the litter waste.

The waste storage bin 56 is readily removable from the housing 12 for ease of clean up. In accordance with a preferred embodiment of the present invention, the waste storage bin 56 may be disposable allowing for the disposal of the litter waste without requiring contact by the pet owner.

Once the litter waste falls through the sidewall aperture 32 and into the waste storage bin 56, rotation of the housing 12 is reversed. As the housing 12 returns to its starting position with the litter use area 50 at the low point of the housing 12, the clean litter will fall from the reservoir 48, through the grate 28 and back to the litter use area 50.

In order to ensure that the housing 12 remains in its starting position, a spring biased friction stop 54 is provided (see FIG. 3). The friction stop 54 engages a recess 55 in the housing 12 providing the user with an indication that the housing 12 has reached its starting position. The friction stop 54 and the recess 55 also provide slight resistance against the housing 12 moving from the starting position. It is further contemplated that controlled rotation of the housing may be achieved by providing the handle with(a stop member for controlling rotation of the housing. In addition, it is also contemplated that the present litter box may be constructed such that the housing can be lifted from the base for cleaning purposes.

As those skilled in the art will certainly appreciate, the functionality of the present litter box 10 is facilitated by the relative positioning of the various components of the litter box 10. For example, it is desired that the litter use area 50 be substantially opposite the sidewall aperture 32 such that the sidewall aperture 32 is at its highest point during rotation while the litter use area 50 is at its lowest point, and vice versa. In addition, it is desired that the first end wall aperture 24, litter use area 50, grate 28, dividing panel 30 and sidewall aperture 32 are consecutively positioned about the circumference of the housing 12. Further, the first end wall aperture 24 should be substantially opposite the dividing panel 30 and the grate 28, more particularly, substantially diametrically opposite either the free edge 46 of the dividing panel 30 or the free edge 40 of the grate 28. By positioning the various components in this manner, the litter area is maximized creating a highly desirable litter box.

Figure 4:
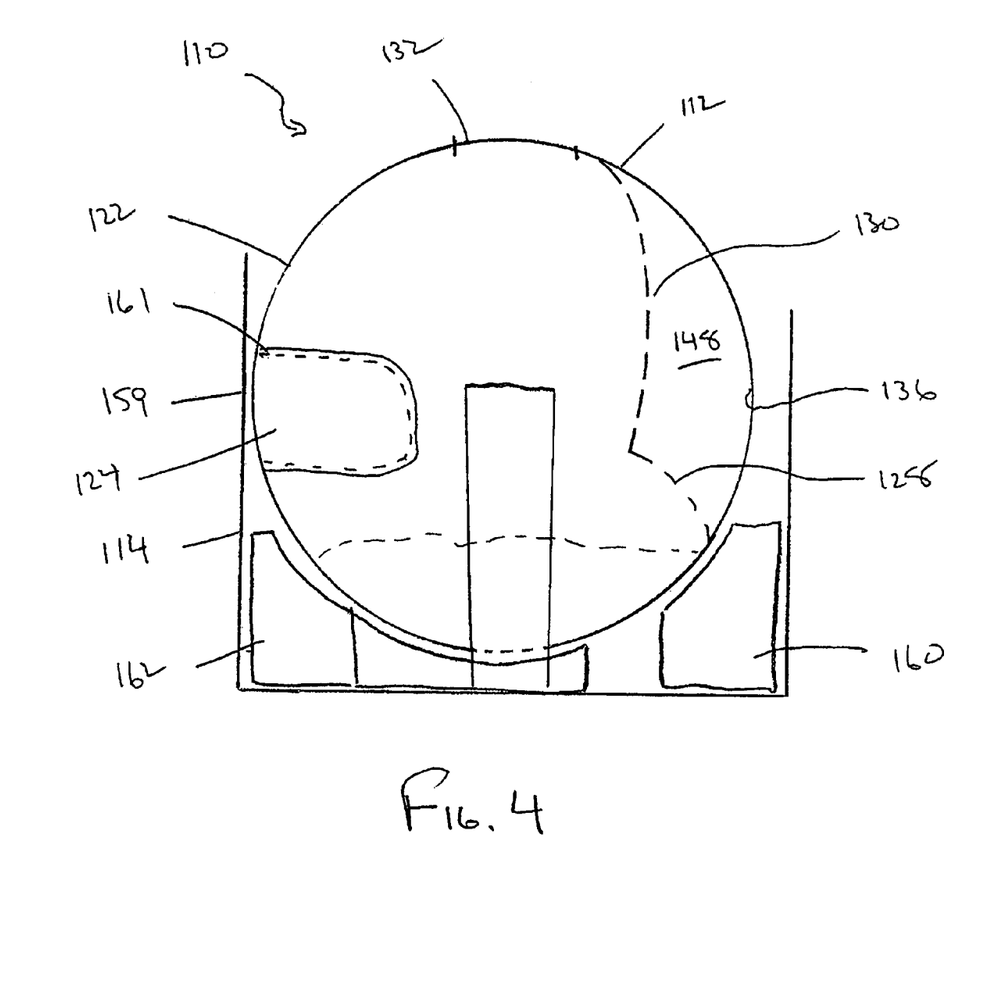
FIG. 4 is an end view of an alternate embodiment of the present litter box with internal components shown in phantom.

With reference to FIG. 4, a further embodiment of the present litter box 110 is disclosed. This embodiment utilizes collection bins 160, 162 for efficiently retrieving both the litter waste and the clean litter. In particular, the litter waste bin 160 is positioned along one side of the housing 112 while the clean litter bin 162 is positioned along an opposite side of the housing 112. With the exception of the clean litter bin 162 and the litter waste bin 160, the litter box 110 is substantially the same as that described with regard to FIGS. 1, 2 and 3.

In particular, the litter waste bin 160 sits along the lower edge of the housing 112 such that litter waste falls within the litter waste bin 160 upon clockwise rotation of the housing 112. In particular, as the housing 112 is rotated in a clockwise direction, the litter within the housing 112 is moved toward the grate 128, the grate 128 defining a barrier preventing litter waste from passing therethrough and into the reservoir 148 defined by the dividing panel 130, the grate 128 and the interior surface 136 of the sidewall 122. Since the litter waste is not permitted to pass through the grate 128 and into the reservoir 148, continued rotation of the housing 112 causes the litter waste to ride over the grate 128 and dividing panel 130 toward the sidewall aperture 132. Once the sidewall aperture 132 reaches a position beyond the horizontal, the litter waste will pass through the sidewall aperture 132, falling into the litter waste bin 160.

Figure 4A:
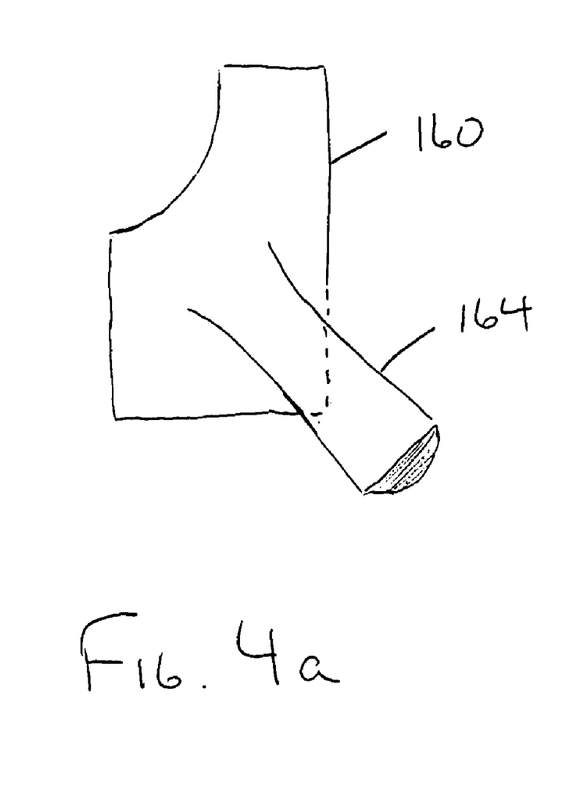
FIG. 4a is a side view of a collection bin as shown in FIG. 4.
Figure 4B:
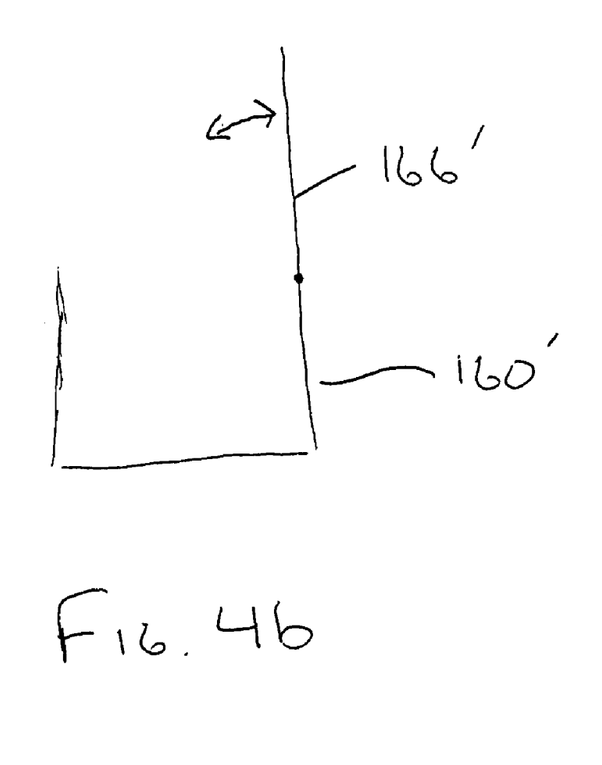
FIG. 4b is a side view of an alternate collection bin.

The litter waste bin 160 is readily removable from adjacent the housing for ease of clean up and may in fact include a disposable spout 164 (see FIG. 4a) allowing for the ready disposal of litter waste without requiring contact by the pet owner. The disposable spout 164 is coupled to the main body of the litter waste bin 160 allowing a user to simply pour waste from the litter waste bin 160. In accordance with an alternate embodiment, and as shown in FIG. 4b, the bin 160' may be formed with a hinged lid 166'.

Once the litter waste falls through the sidewall aperture 132 and into the litter waste bin 160, rotation of the housing 112 is reversed as with the embodiment described with reference to FIGS. 1, 2 and 3.

When an individual wishes to change the litter within the litter box 110, the housing 112 is rotated in a counterclockwise direction. This rotation will ultimately cause the litter to fall into the litter collection bin 162 as the litter comes into contact with the sidewall aperture 132.

The provision of a base 114 with high retaining walls 159 helps to prevent spreading of litter by creating an enclosure about the rotating housing 112. In addition, collection in this manner may further be facilitated by the provision of a removable covet 161 for the first end wall aperture 124.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A pet litter box, comprising:
    an elongated housing including a first end wall and a second end wall, the housing further includes a sidewall extending between the first end wall and the second end wall; and
    a base supporting the housing for rotation about a longitudinal axis, wherein the first end wall is substantially perpendicular to the longitudinal axis;
    the first end wall of the housing including a first end wall aperture shaped and dimensioned for the passage of a pet therethrough, the first end wall aperture being offset from a central longitudinal axis of the housing;
    the housing further includes a grate and a dividing panel respectively extending between the first end wall and the second end wall of the housing, the grate including a first edge which remains in contact with an interior surface of the sidewall to define a grate/sidewall junction and a free edge directed away from the sidewall and the dividing panel similarly includes a first edge which remains in contact with the interior surface of the housing to define a panel/sidewall junction and a free edge that is directed away from the sidewall, the free edge of the dividing panel being secured to the free edge of the grate to define a clean litter reservoir, and wherein the first end wall aperture is diametrically opposed to either the free edge of the dividing panel or the free edge of the grate;
    the sidewall further includes an elongated sidewall aperture positioned adjacent the panel/sidewall junction such that the dividing panel is positioned substantially between the grate and the sidewall aperture;
    wherein rotation of the housing causes litter within the housing to move toward the grate, the grate defining a barrier preventing litter waste from passing therethrough and into the clean litter reservoir defined by the dividing panel and the interior surface of the sidewall such that continued rotation of the housing causes the litter waste to tide over the grate and dividing panel toward the sidewall aperture where the litter waste exits the housing.

2. The litter box according to claim 1, wherein the housing includes a litter use area that is substantially opposite the sidewall aperture.

3. The litter box according to claim 2, wherein the first end wall aperture, litter use area, grate, dividing panel and sidewall aperture are consecutively positioned about the circumference of the housing.

4. The litter box according to claim 1, wherein the longitudinal axis is substantially aligned with a longitudinal axis of the housing.

5. The litter box according to claim 1, further including a motor coupled to the housing for rotating the housing.

6. The litter box according to claim 1, further including a handle coupled to the housing for facilitating rotation of the housing.

7. The litter box according to claim 1, further including a friction stop controlling rotation of the housing.

8. The litter box according to claim 1, wherein the grate is a plastic grid shaped and dimensioned for preventing the passage of litter waste therethrough.

9. The litter box according to claim 1, wherein the housing is cylindrical.

10. The litter box according to claim 1, wherein the housing is made out of metal or plastic.

11. The litter box according to claim 1, further including a waste storage bin positioned adjacent the sidewall aperture.

* * * * *